(12) United States Patent
Lu et al.

(10) Patent No.: US 9,319,485 B2
(45) Date of Patent: Apr. 19, 2016

(54) METHOD FOR TRIGGERING CLOUD SERVICE, CLOUD SERVER, AND THIN CLIENT

(71) Applicant: Huawei Technologies Co., Ltd., Shenzhen, Guangdong (CN)

(72) Inventors: Liangbing Lu, Hangzhou (CN); Zhiyou Guo, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 423 days.

(21) Appl. No.: 14/035,398

(22) Filed: Sep. 24, 2013

(65) Prior Publication Data

US 2014/0129621 A1      May 8, 2014

Related U.S. Application Data

(63) Continuation of application No. PCT/CN2013/073851, filed on Apr. 8, 2013.

(30) Foreign Application Priority Data

Nov. 2, 2012   (CN) .......................... 2012 1 0433373

(51) Int. Cl.
*G06F 15/16* (2006.01)
*H04L 29/06* (2006.01)
*G06F 9/50* (2006.01)
*H04L 29/08* (2006.01)

(52) U.S. Cl.
CPC .............. *H04L 67/42* (2013.01); *G06F 9/5055* (2013.01); *H04L 67/146* (2013.01)

(58) Field of Classification Search
USPC .......... 709/203, 206, 227, 235, 226, 248, 217
See application file for complete search history.

(56) References Cited

U.S. PATENT DOCUMENTS

| | | | |
|---|---|---|---|
| 6,799,178 B2 * | 9/2004 | Iwase ................ | G06F 17/30905 |
| 8,504,083 B1 * | 8/2013 | Gill ......................... | H04W 4/14 |
| | | | 379/88.12 |
| 8,959,217 B2 * | 2/2015 | Mayo .................... | G06F 9/5077 |
| | | | 709/226 |
| 2003/0208472 A1 | 11/2003 | Pham | |
| 2006/0069594 A1 * | 3/2006 | Yamasaki ............. | G06Q 10/06 |
| | | | 709/226 |
| 2011/0138049 A1 | 6/2011 | Dawson et al. | |
| 2011/0176670 A1 | 7/2011 | Kaplan et al. | |
| 2014/0032683 A1 * | 1/2014 | Maheshwari ......... | H04L 51/063 |
| | | | 706/206 |

(Continued)

FOREIGN PATENT DOCUMENTS

| CN | 101150797 A | 3/2008 |
|---|---|---|
| CN | 201114627 A | 9/2008 |

(Continued)

*Primary Examiner* — Jude Jean Gilles

(57) ABSTRACT

Embodiments of the present invention provide a method for triggering a cloud service, a cloud server, and a thin client. The method includes: receiving a user's operation of triggering a key, where the key is in a preset binding relationship with a specific cloud service of the cloud server; and generating a triggering message according to the operation of triggering the key, and sending the triggering message to the cloud server, so that the cloud server invokes the specific cloud service according to the preset binding relationship. The embodiments of the present invention provide a user with a shortcut method for invoking a cloud service through a thin client, thereby improving work efficiency of the user.

31 Claims, 5 Drawing Sheets

(56) References Cited

U.S. PATENT DOCUMENTS

2014/0129917 A1* 5/2014 Cui .................. G06F 17/30867
　　　　　　　　　　　　　　　　　715/234
2014/0156723 A1* 6/2014 Huang .................. H04L 67/02
　　　　　　　　　　　　　　　　　709/203

FOREIGN PATENT DOCUMENTS

| CN | 101556719 A | 10/2009 |
| CN | 101626436 A | 1/2010 |

* cited by examiner

METHOD FOR TRIGGERING CLOUD SERVICE, CLOUD SERVER, AND THIN CLIENT

CROSS-REFERENCE TO RELATED APPLICATIONS

This application is a continuation of International Application No. PCT/CN2013/073851, filed on Apr. 8, 2013, which claims priority to Chinese Patent Application No. 201210433373.9, filed on Nov. 2, 2012, all of which are hereby incorporated by reference in their entireties.

TECHNICAL FIELD

Embodiments of the present invention relate to the IT field, and in particular, to a method for triggering a cloud service, a cloud server, and a thin client.

BACKGROUND

A thin client (thin client) is a small commercial PC dedicated for industrial use, which is based on industrial standard design of a PC and uses a dedicated embedded processor, a miniature local flash memory, and a compact operating system. Functions of the thin client are mainly implemented by using a storage, a processor, and an operating system that are deployed on a remote server. Configuration of the thin client includes: a professional embedded processor with low power consumption and a powerful computing function, an irremovable local flash memory used to store an operating system, a local system memory, a network adapter, a graphics card, and standard optional input/output components of other peripherals. The thin client does not have a removable component, and can provide a more secure and reliable operating environment and has lower power consumption and higher security than a common PC.

Because a typical application scenario of the thin client relates to a labor-intensive industry, a user has a definite working goal and handles work affairs by using a major software office system. For example, in a call center, centrally deployed attendants mainly use a call connection system to complete call connection work. In the terms of software business operations, centrally deployed staffs need to handle, in a software system, some operations that have same use frequency or have high importance.

Such software operations are usually completed in the software system in the following three manners: Click on a certain menu position in the software system; provide a top floating box for a user to click; and provide a combination shortcut key. For a menu operation on a software page, when multiple systems need to be used, the operation needs to switch between the systems; presentation in a top floating manner covers interface content; and if a common shortcut key is defined on a keyboard, the shortcut key is usually obtained by combining multiple keys on the keyboard, which is quite complex and requires a user to learn and memorize. For an operation that has a high use frequency and importance on the thin client, an operation scheme provided in the prior art for a user is not convenient enough.

SUMMARY

Embodiments of the present invention provide a method for triggering a cloud service, a cloud server, and a thin client, so as to provide a user with a shortcut method for invoking a cloud service through a thin client, thereby improving work efficiency of the user.

In a first aspect, an embodiment of the present invention provides a method for triggering a service of a cloud server. The method includes: receiving a user's operation of triggering a key, where the key is in a preset binding relationship with a specific cloud service of the cloud server; and generating a triggering message according to the operation of triggering the key, and sending the triggering message to the cloud server, so that the cloud server invokes the specific cloud service according to the preset binding relationship.

In a first possible implementation manner of the first aspect, the preset binding relationship is a binding relationship between identification information of the key and network address information of a thin client to which the key belongs, and the specific cloud service of the cloud server; the triggering message includes the identification information of the key and the network address information of the thin client to which the key belongs; and the sending the triggering message generated according to that the user triggers the key to the cloud server, so that the cloud server invokes the specific cloud service according to the preset binding relationship includes: sending the identification information of the key and the network address information of the thin client to which the key belongs to the cloud server, so that the cloud server invokes the specific cloud service according to the preset binding relationship.

In a second possible implementation manner of the first aspect, the preset binding relationship is a binding relationship between network address information of a thin client to which the key belongs and the specific cloud service of the cloud server; the triggering message includes the network address information of the thin client to which the key belongs; and the sending the triggering message to the cloud server, so that the cloud server invokes the specific cloud service according to the preset binding relationship includes: sending the network address information of the thin client to which the key belongs to the cloud server, so that the cloud server invokes the specific cloud service according to the preset binding relationship.

In a third possible implementation manner of the first aspect, the preset binding relationship is a binding relationship between identification information of the key and login account information of the user, and the specific cloud service of the cloud server; the triggering message includes the identification information of the key and the login account information of the user; and the sending the triggering message to the cloud server, so that the cloud server invokes the specific cloud service according to the preset binding relationship includes: sending the identification information of the key and the login account information of the user to the cloud server, so that the cloud server invokes the specific cloud service according to the preset binding relationship.

In a fourth possible implementation manner of the first aspect, the preset binding relationship is a binding relationship between login account information of the user and the specific cloud service of the cloud server; the triggering message includes the login account information of the user; and the sending the triggering message to the cloud server, so that the cloud server invokes the specific cloud service according to the preset binding relationship includes: sending the login account information of the user to the cloud server, so that the cloud server invokes the specific cloud service according to the preset binding relationship.

In a fifth possible implementation manner of the first aspect, after the sending the triggering message to the cloud server, so that the cloud server invokes the specific cloud service according to the preset binding relationship, the method further includes: receiving information related to the specific cloud service and sent by the cloud server, and displaying an application interface of the specific cloud service according to the information related to the specific cloud service.

In a sixth possible implementation manner of the first aspect, an indicator is turned on to provide a prompt when the user's operation of triggering the key is received.

In a second aspect, an embodiment of the present invention provides a thin client, configured to connect a user to a cloud server. The thin client includes a key, a sending unit, and a message generating unit. The key is configured to receive user triggering, and the key is in a preset binding relationship with a specific cloud service of the cloud server; the message generating unit is configured to generate a triggering message according to an operation of triggering the key; and the sending unit is configured to send the triggering message to the cloud server, so that the cloud server invokes the specific cloud service according to the preset binding relationship.

In a first possible implementation manner of the second aspect, the preset binding relationship is a binding relationship between identification information of the key and network address information of the thin client to which the key belongs, and the specific cloud service of the cloud server; the triggering message includes the identification information of the key and the network address information of the thin client to which the key belongs; and the sending unit is configured to send the triggering message that includes the identification information of the key and the network address information of the thin client to which the key belongs to the cloud server, so that the cloud server invokes the specific cloud service according to the preset binding relationship.

In a second possible implementation manner of the second aspect, the preset binding relationship is a binding relationship between network address information of the thin client to which the key belongs and the specific cloud service of the cloud server; the triggering message includes the network address information of the thin client to which the key belongs; and the sending unit is configured to send the triggering message that includes the network address information of the thin client to which the key belongs to the cloud server, so that the cloud server invokes the specific cloud service according to the preset binding relationship.

In a third possible implementation manner of the second aspect, the preset binding relationship is a binding relationship between identification information of the key and login account information of the user, and the specific cloud service of the cloud server; the triggering message includes the identification information of the key and login account information that is input when the user logs in to the thin client; and the sending unit is configured to send the triggering message that includes the identification information of the key and the login account information of the user to the cloud server, so that the cloud server invokes the specific cloud service according to the preset binding relationship.

In a fourth possible implementation manner of the second aspect, the preset binding relationship is a binding relationship between login account information of the user and the specific cloud service of the cloud server; the triggering message includes login account information that is input when the user logs in to the thin client; and the sending unit is configured to send the triggering message of the login account information of the user to the cloud server, so that the cloud server invokes the specific cloud service according to the preset binding relationship.

In a fifth possible implementation manner of the second aspect, the thin client further includes a displaying unit and a receiving unit. The receiving unit is configured to, when the cloud server invokes the specific cloud service, receive information related to the specific cloud service and sent by the cloud server; and the displaying unit is configured to, after the information related to the specific cloud service and sent by the cloud server is received, display an interface of the specific cloud service according to the information related to the specific cloud service.

In a sixth possible implementation manner of the second aspect, the displaying unit includes a touch display, an LCD display, or an LED display.

In a seventh possible implementation manner of the second aspect, the thin client further includes an indicator, where the indicator is configured to provide a prompt by being turned on when a user's operation of triggering the key is received.

In a third aspect, the present invention provides a method for invoking a cloud service. The method includes: receiving a triggering message that is generated by a thin client according to triggering of a key; and invoking a specific cloud service according to the triggering message, where the key is in a preset binding relationship with the specific cloud service.

In a first possible implementation manner of the third aspect, the triggering message includes identification information identifying the key and network address information of a thin client to which the key belongs; and the receiving a triggering message that is generated by a thin client according to triggering of a key includes: receiving the triggering message that includes the identification information of the key and the network address information of the thin client to which the key belongs.

In a second possible implementation manner of the third aspect, the triggering message includes network address information of a thin client to which the key belongs; and the receiving a triggering message that is generated by a thin client according to triggering of a key includes: receiving the triggering message that includes the network address information of the thin client to which the key belongs.

In a third possible implementation manner of the third aspect, the triggering message includes identification information of the key and login account information that is input when a user logs in to the thin client; and the receiving a triggering message that is generated by a thin client according to triggering of a key includes: receiving the triggering message that includes the identification information of the key and the login account information that is input when the user logs in to the thin client.

In a fourth possible implementation manner of the third aspect, the triggering message includes login account information that is input when a user logs in to the thin client; and the receiving a triggering message that is generated by a thin client according to triggering of a key includes: receiving the triggering message that includes the login account information that is input when the user logs in to the thin client.

In a fifth possible implementation manner of the third aspect, after the invoking the specific cloud service according to the triggering message, the method further includes sending information related to the specific cloud service, so that the thin client displays an interface of the specific cloud service according to the information related to the specific cloud service.

In a sixth possible implementation manner of the third aspect, before the receiving a triggering message that is generated by a thin client according to triggering of a key, the method further includes: receiving a user-configured invoking relationship between the key and the specific cloud service, and generating a configuration file according to information of the invoking relationship between the key and the specific cloud service; and the invoking the specific cloud service according to the triggering message includes: invoking the specific cloud service according to the triggering message and the configuration file.

In a fourth aspect, an embodiment of the present invention provides a cloud server. The cloud server includes a receiving unit and a service invoking unit. The receiving unit is configured to receive a triggering message that is generated by a thin client according to triggering of a key; and the service invoking unit is configured to invoke a specific cloud service according to the triggering message, where the key is in a preset binding relationship with the specific cloud service.

In a first possible implementation manner of the fourth aspect, the triggering message includes identification information identifying the key and network address information of a thin client to which the key belongs; and the service invoking unit is configured to receive the triggering message that includes the identification information of the key and the network address information of the thin client to which the key belongs.

In a second possible implementation manner of the fourth aspect, the triggering message includes network address information of a thin client to which the key belongs; and the service invoking unit is configured to receive the triggering message that includes the network address information of the thin client to which the key belongs.

In a third possible implementation manner of the fourth aspect, the triggering message includes identification information of the key and login account information that is input when a user logs in to the thin client; and the service invoking unit is configured to receive the triggering message that includes the identification information of the key and the login account information that is input when the user logs in to the thin client.

In a fourth possible implementation manner of the fourth aspect, the triggering message includes login account information that is input when a user logs in to the thin client; and the service invoking unit is configured to receive the triggering message that includes the login account information that is input when the user logs in to the thin client.

In a fifth possible implementation manner of the fourth aspect, the cloud server further includes a sending unit, configured to, after the service invoking unit invokes the specific cloud service according to the triggering message, send information related to the specific cloud service, so that the thin client displays an interface of the specific cloud service according to the information related to the specific cloud service.

In a sixth possible implementation manner of the fourth aspect, the receiving unit is further configured to receive a user-configured invoking relationship between the key and the specific cloud service; the cloud server further includes a configuration file generating unit, configured to generate a configuration file according to information of the invoking relationship between the key and the specific cloud service after the receiving unit receives the user-configured invoking relationship between the key and the specific cloud service; and the service invoking unit is configured to invoke the specific cloud service according to the triggering message and the configuration file that is generated by the configuration file generating unit.

In a seventh possible implementation manner of the fourth aspect, the cloud server further includes a cloud service processing unit, configured to, when the service invoking unit invokes the specific cloud service according to the triggering message, execute the specific cloud service.

In an eighth possible implementation manner of the fourth aspect, the cloud server further includes a storage unit. The storage unit is configured to store the preset binding relationship; and the service invoking unit is configured to obtain the preset binding relationship stored in the storage unit.

In a fifth aspect, an embodiment of the present invention provides a cloud service system. The system includes the thin client according to any one of the foregoing items and the cloud server according to any one of the foregoing items.

According to the embodiments of the present invention, the thin client provides the key that is in the preset binding relationship with the specific cloud service, and the triggering message may be sent to the cloud server as long as the user's triggering of the key is received, so that the cloud server invokes the specific cloud service according to the preset binding relationship. Only a one-touch operation is required to invoke the specific cloud service, including application software most frequently used by a specific industry professional, which is used quickly and conveniently, thereby greatly improving work efficiency of a user.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show only some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
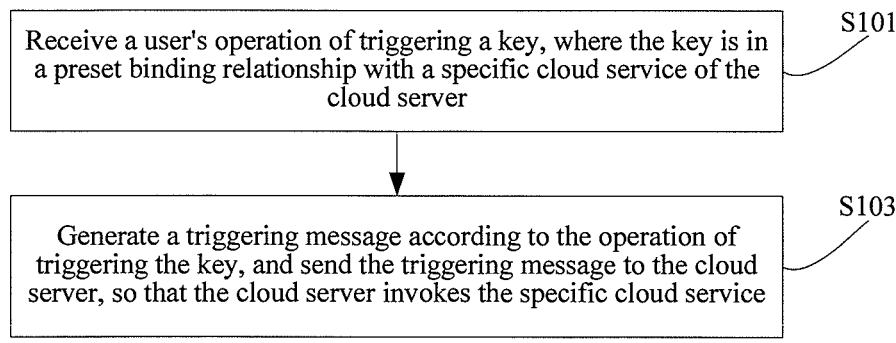
FIG. 1 is a flowchart of a method for triggering a service of a cloud server according to an embodiment of the present invention.

An embodiment of the present invention provides a method for triggering a service of a cloud server. As shown in FIG. 1, FIG. 1 is a flowchart according to an embodiment of the present invention. The method includes: S101. Receive a user's operation of triggering a key, where the key is in a preset binding relationship with a specific cloud service of the cloud server; and S103. Generate a triggering message according to the operation of triggering the key, and send the triggering message to the cloud server, so that the cloud server invokes the specific cloud service according to the preset binding relationship.

The key is set on a thin client, and the thin client includes one or multiple keys. The key is not a key on a keyboard, but is one or multiple independent keys set on the client. If the thin client includes one key, a specific cloud service that is in a preset binding relationship with the key is application software most frequently used by a specific industry professional. If the thin client includes multiple keys, specific cloud services that are in a preset binding relationship with the multiple keys are application software most frequently used by a specific industry professional, application software less most frequently used, and so on. Through one-touch triggering of the key, a user can invoke the application software most frequently used and less most frequently used without excessive extra memorization.

In an embodiment of the present invention, the preset binding relationship is a binding relationship between identification information of the key and network address information of a thin client to which the key belongs, and the specific cloud service of the cloud server; the triggering message includes the identification information of the key and the network address information of the thin client to which the key belongs; and the sending the triggering message generated according to that the user triggers the key to the cloud server, so that the cloud server invokes the specific cloud service according to the preset binding relationship includes: sending the identification information of the key and the network address information of the thin client to which the key belongs to the cloud server, so that the cloud server invokes the specific cloud service according to the preset binding relationship.

If the thin client includes multiple keys, each key corresponds to one key identity of each key. The key is not a key on a keyboard, but is one or multiple independent keys set on the client. When the triggering message is sent, the triggering message includes identification information of the key. The key may be a key set nearby a power-on button of the thin client or at any other position of the thin client. There is a great variety of keys and key combinations on a keyboard, which are difficult to memorize. While the number of keys set on the thin client is small, which correspond to invoked specific cloud services and are easy to memorize. A user does not need to memorize them with great effort.

In another embodiment of the present invention, the preset binding relationship is a binding relationship between identification information of the key and login account information of the user, and the specific cloud service of the cloud server; the triggering message includes the identification information of the key and the login account information of the user; and the sending the triggering message to the cloud server, so that the cloud server invokes the specific cloud service according to the preset binding relationship includes: sending the identification information of the key and the login account information of the user to the cloud server, so that the cloud server invokes the specific cloud service according to the preset binding relationship.

If the preset binding relationship is a binding relationship between the identification information of the key and the login account information of the user, and the specific cloud service of the cloud server, the user needs only to enter the login account information of the user before triggering the key, so that the specific cloud service can be quickly invoked at any network position.

In another embodiment of the present invention, the preset binding relationship is a binding relationship between login account information of the user and the specific cloud service of the cloud server; the triggering message includes identification information identifying the key; and the sending the triggering message to the cloud server, so that the cloud server invokes the specific cloud service according to the preset binding relationship includes: sending the identification information of the key to the cloud server, so that the cloud server invokes the specific cloud service according to the preset binding relationship.

If the thin client includes one key, each key does not need one key identity that corresponds to each key. When the triggering message is sent, the triggering message does not include identification information of the key.

In still another embodiment of the present invention, the preset binding relationship is a binding relationship between network address information of a thin client to which the key belongs and the specific cloud service of the cloud server; the triggering message includes the network address information of the thin client to which the key belongs; and the sending the triggering message to the cloud server, so that the cloud server invokes the specific cloud service according to the preset binding relationship includes: sending the network address information of the thin client to which the key belongs to the cloud server, so that the cloud server invokes the specific cloud service according to the preset binding relationship.

Figure 2:
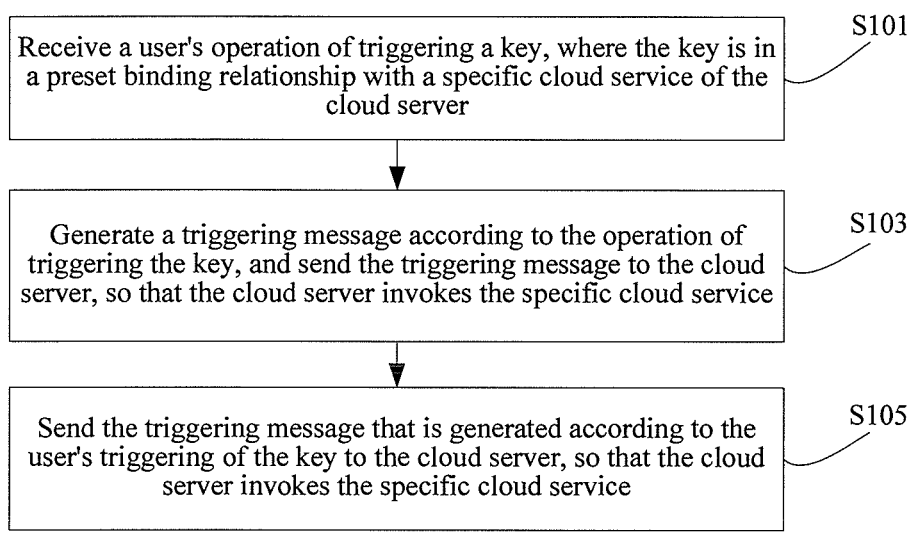
FIG. 2 is a flowchart of a method for triggering a service of a cloud server according to another embodiment of the present invention.

In an embodiment of the present invention, as shown in FIG. 2, FIG. 2 is a flowchart according to an embodiment of the present invention. After the sending the triggering message to the cloud server, so that the cloud server invokes the specific cloud service according to the preset binding relationship in S103, the method further includes S105: Receive information related to the specific cloud service and sent by the cloud server, and display an application interface of the specific cloud service according to the information related to the specific cloud service.

The thin client includes a display, configured to display the application interface of the specific cloud service according to the information related to the specific cloud service.

In an embodiment of the present invention, an indicator is turned on to provide a prompt when the user's operation of triggering the key is received.

The thin client further includes an indicator corresponding to the key, so that the indicator corresponding to the key is turned on when the key receives user triggering.

An embodiment of the present invention provides a device. The device includes a memory and a processor. The memory is in a coupling relationship with the processor. The processor is configured to receive a user's operation of triggering a key, where the key is in a preset binding relationship with a specific cloud service of the cloud server; and send the triggering message to the cloud server, so that the cloud server invokes the specific cloud service according to the preset binding relationship.

Figure 3:
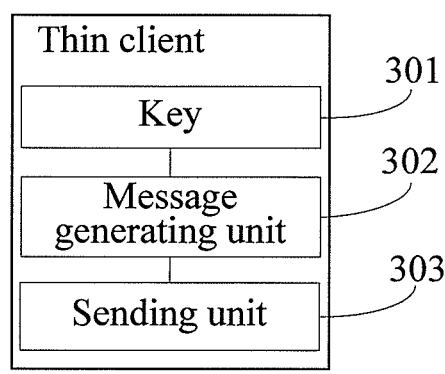
FIG. 3 is a structural diagram of a thin client according to an embodiment of the present invention.

The present invention provides a thin client, configured to connect a user to a cloud server. As shown in FIG. 3, FIG. 3 is a structural diagram according to an embodiment of the present invention. The thin client includes a key 301, a message generating unit 302, and a sending unit 303. The key is configured to receive user triggering, and the key is in a preset binding relationship with a specific cloud service of the cloud server; the message generating unit is configured to generate a triggering message according to an operation of triggering the key; and the sending unit is configured to send the triggering message to the cloud server, so that the cloud server invokes the specific cloud service according to the preset binding relationship.

In an embodiment of the present invention, the preset binding relationship is a binding relationship between identification information of the key and network address information of the thin client to which the key belongs, and the specific cloud service of the cloud server; the triggering message includes the identification information of the key and the network address information of the thin client to which the key belongs; and the sending unit is configured to send the triggering message that includes the identification information of the key and the network address information of the thin client to which the key belongs to the cloud server, so that the cloud server invokes the specific cloud service according to the preset binding relationship.

In an embodiment of the present invention, the preset binding relationship is a binding relationship between identification information of the key and login account information of the user, and the specific cloud service of the cloud server; the triggering message includes the identification information of the key and login account information that is input when the user logs in to the thin client; and the sending unit is configured to send the triggering message that includes the identification information of the key and the login account information of the user to the cloud server, so that the cloud server invokes the specific cloud service according to the preset binding relationship.

In an embodiment of the present invention, the preset binding relationship is a binding relationship between network address information of the thin client to which the key belongs and the specific cloud service of the cloud server; the triggering message includes the network address information of the thin client to which the key belongs; and the sending unit is configured to send the triggering message that includes the network address information of the thin client to which the key belongs to the cloud server, so that the cloud server invokes the specific cloud service according to the preset binding relationship.

In an embodiment of the present invention, the preset binding relationship is a binding relationship between login account information of the user and the specific cloud service of the cloud server; the triggering message includes login account information that is input when the user logs in to the thin client; and the sending unit is configured to send the triggering message that includes the login account information of the user to the cloud server, so that the cloud server invokes the specific cloud service according to the preset binding relationship.

Figure 4:
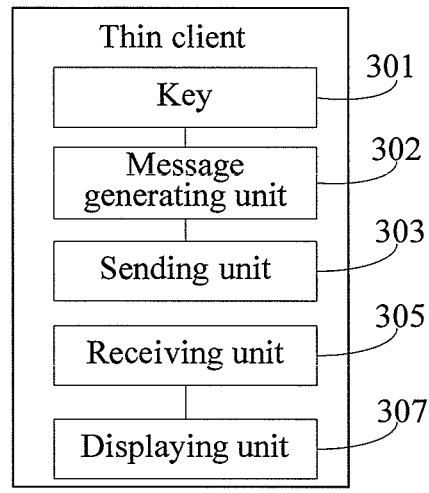
FIG. 4 is a structural diagram of a thin client according to another embodiment of the present invention.

In an embodiment of the present invention, as shown in FIG. 4, the thin client further includes a displaying unit 307 and a receiving unit 303. The receiving unit is configured to, when the cloud server invokes the specific cloud service, receive information related to the specific cloud service and sent by the cloud server; and the displaying unit is configured to, after the information related to the specific cloud service and sent by the cloud server is received, display an interface of the specific cloud service according to the information related to the specific cloud service.

In this embodiment of the present invention, the receiving unit and the sending unit are configured to receive and send information of the thin client and the cloud server; and the receiving and sending of the information are performed according to an information transceiving protocol of the thin client and the cloud server.

In an embodiment of the present invention, the displaying unit includes a touch display, an LCD display, or an LED display.

Figure 5:
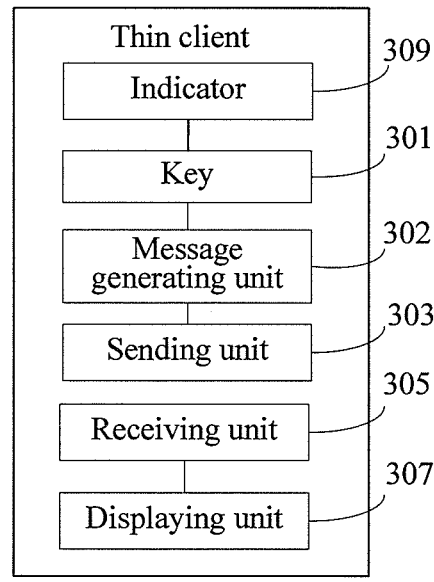
FIG. 5 is a structural diagram of a thin client according to still another embodiment of the present invention.

In an embodiment of the present invention, as shown in FIG. 5, the thin client includes an indicator 309, where the indicator is configured to provide a prompt by being turned on when a user's operation of triggering the key is received.

In this embodiment of the present invention, the thin client may be embedded in a computer device or may be a computer device, such as a general-purpose computer, a customized device, or a portable device such as a mobile terminal or a tablet. The computer device includes: a processing unit, an input device, an output device, a storage device, and a communications interface. Various components of the apparatus are coupled by using a bus system. The bus system includes a data bus, a power bus, a control bus, and a status signal bus.

The input device of the thin client includes a key; the communications interface includes a sending unit; the key is configured to receive user triggering, and the key is in a preset binding relationship with a specific service of the cloud server; the storage device includes a command and data; and the processing unit is coupled to the storage device, and executes the command of the storage unit to control the sending unit to send the triggering message to the cloud server, so that the cloud server invokes the specific cloud service according to the preset binding relationship.

In this embodiment of the present invention, the processing unit coupled to the storage device is further configured to execute the command of the storage unit to implement the method described in any one of the foregoing embodiments or functions of the apparatus described in any one of the thin client embodiments.

The output device includes the receiving unit, configured to, when the cloud server invokes the specific cloud service, receive information related to the specific cloud service and sent by the cloud server; and the output device further includes the displaying unit, configured to, after the information related to the specific cloud service and sent by the cloud server is received, display an interface of the specific cloud service according to the information related to the specific cloud service.

The processing unit may be: a general-purpose central processing unit (central procession unit, CPU), an application specific integrated circuit (application specific integrated circuit, ASIC), a digital signal processor (DSP), a field programmable gate array (FPGA), or another programmable logic device. The input device further includes: a keyboard, a mouse, a touch input device, a microphone, and the like. The output device further includes a horn and the like.

The storage device may be any available medium accessible to a computer, including but not limited to: a read only memory (read only memory, ROM), a random access memory (random access memory, RAM), or a disk storage (disk storage), a flash memory, a programmable read-only memory or an electrically erasable programmable memory, a register, and a storage medium commonly known in the field.

The storage device is configured to provide a command and data for the processing unit, and is connected to the processing unit by using a bus.

The storage device stores: an operating system, an application program, and program codes used to implement this embodiment of the present invention. The operating system is used to control and implement a processing function performed by the processing unit; and the application program includes program codes, such as word processing software and email software.

The program codes used to implement this embodiment of the present invention are coupled to the processing unit to implement the methods described in the method embodiments.

The apparatus further includes a communications interface. The communications interface is configured to connect the apparatus to a communications network. The communications network includes the Ethernet, a radio access network (radio access network, RAN), a wireless local area network (wireless local area network, WLAN), or another similar network.

Figure 6:
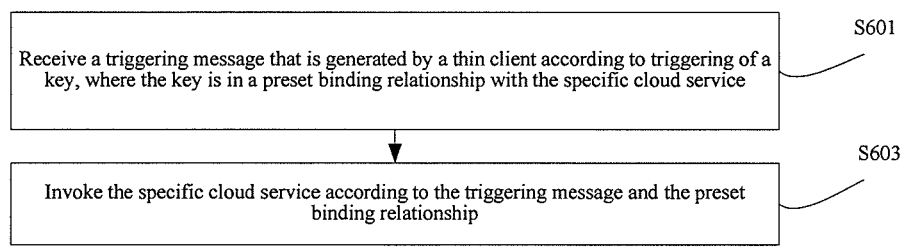
FIG. 6 is a flowchart of a method for invoking a cloud service according to an embodiment of the present invention.

An embodiment of the present invention provides a method for invoking a cloud service. As shown in FIG. 6, FIG. 6 is a flowchart of the method for invoking a cloud service according to an embodiment of the present invention. The method includes: receiving a triggering message that is generated by a thin client according to triggering of a key; and invoking the specific cloud service according to the triggering message, where the key is in a preset binding relationship with the specific cloud service.

The key is not a key on a keyboard, but is one or multiple independent keys set on the thin client. The key may be a key set nearby a power-on button of the thin client or at any other position of the thin client. There is a great variety of keys and key combinations on a keyboard, which are difficult to memorize. While the number of keys set on the thin client is small, which correspond to invoked specific cloud services and are ease to memorize. A user does not need to memorize them with great effort.

In an embodiment of the present invention, the triggering message includes identification information identifying the key and network address information of a thin client to which the key belongs; and the receiving a triggering message that is generated by a thin client according to triggering of a key includes: receiving the triggering message that includes the identification information of the key and the network address information of the thin client to which the key belongs.

In an embodiment of the present invention, the triggering message includes network address information of a thin client to which the key belongs; and the receiving a triggering message that is generated by a thin client according to triggering of a key includes: receiving the triggering message that includes the network address information of the thin client to which the key belongs.

In an embodiment of the present invention, the triggering message includes identification information of the key and login account information that is input when a user logs in to the thin client; and the receiving a triggering message that is generated by a thin client according to triggering of a key includes: receiving the triggering message that includes the identification information of the key and the login account information that is input when the user logs in to the thin client.

In an embodiment of the present invention, the triggering message includes login account information that is input when a user logs in to the thin client; and the receiving a triggering message that is generated by a thin client according to triggering of a key includes: receiving the triggering message that includes the login account information that is input when the user logs in to the thin client.

Figure 7:
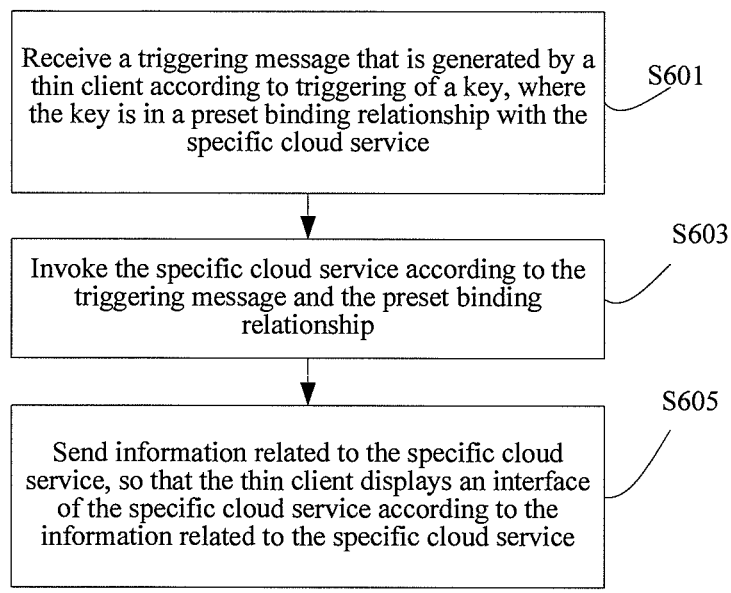
FIG. 7 is a flowchart of a method for invoking a cloud service according to another embodiment of the present invention.

In an embodiment of the present invention, as shown in FIG. 7, after the invoking the specific cloud service according to the triggering message, the method further includes S605: Send information related to the specific cloud service, so that the thin client displays an interface of the specific cloud service according to the information related to the specific cloud service.

Figure 8:
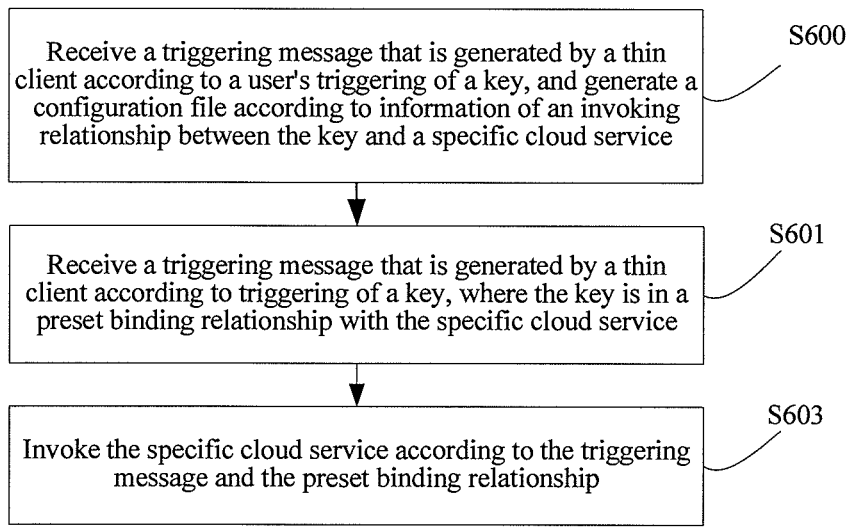
FIG. 8 is a flowchart of a method for invoking a cloud service according to still another embodiment of the present invention.

In an embodiment of the present invention, as shown in FIG. 8, before the receiving a triggering message that is generated by a thin client according to triggering of a key, the method further includes S600: Receive a user-configured invoking relationship between the key and the specific cloud service, and generate a configuration file according to information of the invoking relationship between the key and the specific cloud service; and the invoking the specific cloud service according to the triggering message includes: invoking the specific cloud service according to the triggering message and the configuration file.

If the triggering message includes identification information identifying the key and network address information of a thin client to which the key belongs, the configuration file stores a mapping between the identification information of the key and the network address information of the thin client to which the key belongs, and the specific cloud service; if the triggering message includes network address information of a thin client to which the key belongs, the configuration file stores a mapping between the network address information of the thin client to which the key belongs and the specific cloud service; if the triggering message includes identification information identifying the key and login account information that is input when a user logs in to the thin client, the configuration file stores a mapping between the identification information of the key and the login account information that is input when the user logs in to the thin client, and the specific cloud service; or if the triggering message includes login account information that is input when a user logs in to the thin client, the configuration file stores a mapping between the login account information that is input when the user logs in to the thin client and the specific cloud service.

With the method provided in this embodiment of the present invention, after a triggering message generated by one-touch triggering of a user is received, a specific cloud service bound to a key can be invoked. In particular, the specific cloud service is application software most frequently used or less most frequently used by a specific industry professional. In this way, the user operates conveniently, thereby improving use efficiency of the user.

An embodiment of the present invention provides a device. The device includes a memory and a processor. The memory is in a coupling relationship with the processor. The processor is configured to receive a triggering message that is generated by a thin client according to triggering of a key, and invoke the specific cloud service according to the triggering message, where the key is in a preset binding relationship with the specific cloud service.

Figure 9:
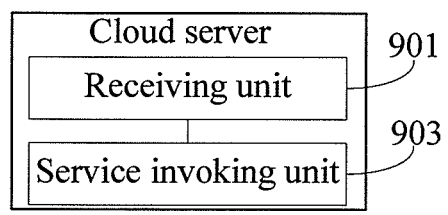
FIG. 9 is a structural diagram of a cloud server according to an embodiment of the present invention.
Figure 10:
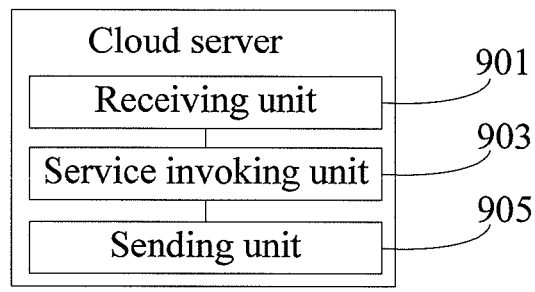
FIG. 10 is a structural diagram of a cloud server according to another embodiment of the present invention.

An embodiment of the present invention provides a cloud server, as shown in FIG. 9. The cloud server includes a receiving unit 901 and a service invoking unit 903. The receiving unit is configured to receive a triggering message that is generated by a thin client according to triggering of a key; and the service invoking unit is configured to invoke the specific cloud service according to the triggering message, where the key is in a preset binding relationship with the specific cloud service.

In an embodiment of the present invention, the triggering message includes identification information identifying the key and network address information of a thin client to which the key belongs; and the service invoking unit is configured to receive the triggering message that includes the identification information of the key and the network address information of the thin client to which the key belongs.

In an embodiment of the present invention, the triggering message includes network address information of a thin client to which the key belongs; and the service invoking unit is configured to receive the triggering message that includes the network address information of the thin client to which the key belongs.

In an embodiment of the present invention, the triggering message includes identification information of the key and login account information that is input when a user logs in to the thin client; and the service invoking unit is configured to receive the triggering message that includes the identification information of the key and the login account information that is input when the user logs in to the thin client.

In an embodiment of the present invention, the triggering message includes login account information that is input when a user logs in to the thin client; and the service invoking unit is configured to receive the triggering message that includes the login account information that is input when the user logs in to the thin client.

In an embodiment of the present invention, the cloud server further includes a sending unit 905, configured to, after the service invoking unit invokes the specific cloud service according to the triggering message, send information related to the specific cloud service, so that the thin client displays an interface of the specific cloud service according to the information related to the specific cloud service.

Figure 11:
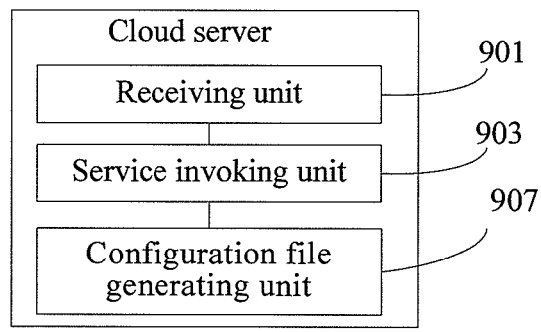
FIG. 11 is a structural diagram of a cloud server according to still another embodiment of the present invention.

In an embodiment of the present invention, as shown in FIG. 11, the receiving unit is further configured to receive a user-configured invoking relationship between the key and the specific cloud service; the cloud server further includes a configuration file generating unit 907, configured to generate a configuration file according to information of the invoking relationship between the key and the specific cloud service after the receiving unit receives the user-configured invoking relationship between the key and the specific cloud service; and the service invoking unit is configured to invoke the specific cloud service according to the triggering message and the configuration file.

In an embodiment of the present invention, the cloud server further includes a cloud service processing unit, configured to, when the service invoking unit invokes the specific cloud service according to the triggering message, execute the specific cloud service.

In an embodiment of the present invention, the cloud server further includes a storage unit. The storage unit is configured to store the preset binding relationship; and the service invoking unit is configured to obtain the preset binding relationship stored in the storage unit. With the cloud server provided in this embodiment of the present invention, after a triggering message generated by one-touch triggering of a user is received, a specific cloud service bound to a key can be invoked. In particular, the specific cloud service is application software most frequently used or less most frequently used by a specific industry professional. In this way, the user operates conveniently, thereby improving use efficiency of the user.

In this embodiment of the present invention, the cloud server may be embedded in a computer device or may be a computer device, such as a general-purpose computer, a customized device, or a portable device such as a mobile terminal or a tablet.

Figure 12:
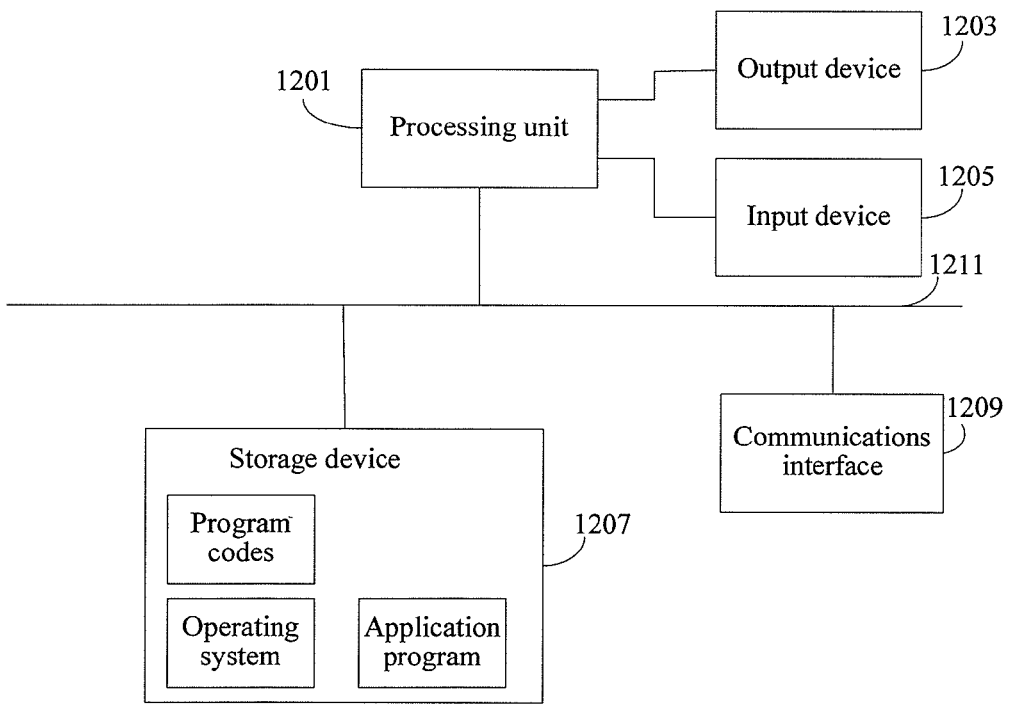
FIG. 12 is a structural diagram of a computer device that includes a cloud server according to an embodiment of the present invention.
Figure 13:
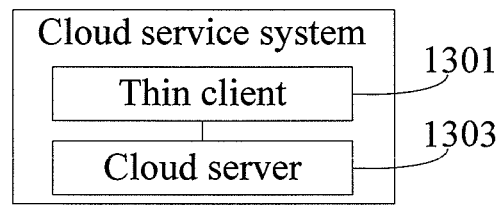
FIG. 13 is a structural diagram of a cloud service system according to an embodiment of the present invention.

As shown in FIG. 12, FIG. 12 is a structural diagram of a computer system that includes a cloud server according to an embodiment of the present invention. The computer device includes: a processing unit 1201, an output device 1203, an input device 1205, a storage device 1207, a communications interface 1209, and a system bus. Various components of the apparatus are coupled by using a bus system 1211. The bus system includes a data bus, a power bus, a control bus, and a status signal bus. In this embodiment of the present invention, the communications interface includes a receiving unit; the receiving unit is configured to receive a triggering message that is generated by a thin client according to triggering of a key; the storage device includes a command and data; and the processing unit is configured to get coupled to the storage device and invoke codes included in the storage device to invoke the specific cloud service according to the triggering message, where the key is in a preset binding relationship with the specific cloud service.

The communications interface further includes a sending unit, configured to, after the service invoking unit invokes the specific cloud service according to the triggering message, send information related to the specific cloud service, so that the thin client displays an interface of the specific cloud service according to the information related to the specific cloud service.

The receiving unit is further configured to receive a user-configured invoking relationship between the key and the specific cloud service.

The processing unit coupled to the storage device is further configured to invoke the codes included in the storage device to implement the method for invoking a cloud service described in any one of the foregoing embodiments and functions of the cloud server described in any one of the foregoing embodiments.

The processing unit may be: a general-purpose central processing unit (central procession unit, CPU), an application specific integrated circuit (application specific integrated circuit, ASIC), a digital signal processor (DSP), a field programmable gate array (FPGA), or another programmable logic device. The input device includes: a keyboard, a mouse, a touch input device, a microphone, and the like. The output device includes a display, a horn, and the like.

The storage device may be any available medium accessible to a computer, including but not limited to: a read only memory (read only memory, ROM), a random access memory (random access memory, RAM), or a disk storage (disk storage), a flash memory, a programmable read-only memory or an electrically erasable programmable memory, a register, and a storage medium commonly known in the field. The storage device is configured to provide a command and data for the processing unit, and is connected to the processing unit by using a bus.

The storage device stores: an operating system, an application program, and program codes used to implement this embodiment of the present invention. The operating system is used to control and implement a processing function performed by the processing unit; and the application program includes program codes, such as word processing software and email software.

An embodiment of the present invention provides a cloud service system, as shown in FIG. 12. The system includes the thin client provided in any one of the foregoing embodiments and the cloud server provided in any one of the foregoing embodiments.

Through the description of the foregoing embodiments, persons skilled in the art may be clearly aware that the present invention may be implemented through hardware, or firmware, or a combination of hardware and firmware. When the present invention is implemented by using software, the foregoing functions may be stored in a computer readable medium, or transmitted as one or multiple commands or codes on a computer readable medium. The computer readable medium includes a computer storage medium and a communications medium. The communications medium includes any medium that facilitates transmission of a computer program from one place to another place. The storage medium may be any available medium accessible to a computer. The following is taken as an example but is not limited to: The computer readable medium may include an RAM, an ROM, an EEPROM, a CD-ROM or another optical disk storage, a disk storage medium or another disk storage device, or any other medium that can be used to carry or store an expected program code in a command or data structure form and can be accessed by a computer. In addition, any connection may appropriately become a computer readable medium. For example, if the software performs transmission from a website, a server, or another remote source by using a coaxial cable, an optical cable, a twisted pair, a digital subscriber line (DSL), or a wireless technology such as infrared, radio, or microwave, the coaxial cable, the optical cable, the twisted pair, the DSL, or the wireless technology such as infrared, radio, or microwave is included in fixation of a home medium. For example, a disk (Disk) and a disc (disc) used in the present invention include a compressed compact disc (CD), a laser disc, an optical disc, a digital versatile disc (DVD), a floppy disk, and a blue-ray disc. Usually a disk magnetically duplicates data, while a disc optically duplicates data by using laser. A combination of the foregoing should also be included in the protection scope of the computer readable medium.

Persons skilled in the art may understand that the accompanying drawings are only schematic diagrams of the exemplary embodiments and the modules or procedures in the accompanying drawings are not necessarily mandatory for carrying out the present invention.

Persons skilled in the art may understand that the modules in the apparatuses provided in the embodiments may be arranged in the apparatuses in a distributed manner according to the description of the embodiments, or may be located in one or multiple apparatuses that are different from those described in the embodiments. The modules in the foregoing embodiments may be combined into one module, or split into multiple sub-modules.

Finally, it should be noted that the foregoing embodiments are only intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features of the technical solutions, as long as these modifications or replacements do not make the essence of corresponding technical solutions depart from the spirit and scope of the technical solutions in the embodiments of the present invention.

What is claimed is:

1. A method for triggering a service of a cloud server, the method comprising:
   receiving a user's operation of triggering a key, wherein the key is in a preset binding relationship with a specific cloud service of the cloud server; and
   generating a triggering message according to the operation of triggering the key, and sending the triggering message to the cloud server, so that the cloud server invokes the specific cloud service according to the preset binding relationship.

2. The method according to claim 1, wherein:
   the preset binding relationship is a binding relationship between identification information of the key and network address information of a thin client to which the key belongs, and the specific cloud service of the cloud server;
   the triggering message comprises the identification information of the key and the network address information of the thin client to which the key belongs; and
   sending the triggering message to the cloud server, so that the cloud server invokes the specific cloud service according to the preset binding relationship comprises: sending the identification information of the key and the network address information of the thin client to which the key belongs to the cloud server, so that the cloud server invokes the specific cloud service according to the preset binding relationship.

3. The method according to claim 1, wherein:
   the preset binding relationship is a binding relationship between network address information of a thin client to which the key belongs and the specific cloud service of the cloud server;
   the triggering message comprises the network address information of the thin client to which the key belongs; and
   sending the triggering message to the cloud server, so that the cloud server invokes the specific cloud service according to the preset binding relationship comprises: sending the network address information of the thin client to which the key belongs to the cloud server, so that the cloud server invokes the specific cloud service according to the preset binding relationship.

4. The method according to claim 1, wherein:
   the preset binding relationship is a binding relationship between identification information of the key and login account information of the user, and the specific cloud service of the cloud server;
   the triggering message comprises the identification information of the key and the login account information of the user; and
   sending the triggering message to the cloud server, so that the cloud server invokes the specific cloud service according to the preset binding relationship comprises: sending the identification information of the key and the login account information of the user to the cloud server, so that the cloud server invokes the specific cloud service according to the preset binding relationship.

5. The method according to claim 1, wherein:
   the preset binding relationship is a binding relationship between login account information of the user and the specific cloud service of the cloud server;
   the triggering message comprises the login account information of the user; and
   sending the triggering message to the cloud server, so that the cloud server invokes the specific cloud service according to the preset binding relationship comprises: sending the login account information of the user to the cloud server, so that the cloud server invokes the specific cloud service according to the preset binding relationship.

6. The method according to claim 1, wherein after sending the triggering message to the cloud server, so that the cloud server invokes the specific cloud service according to the preset binding relationship, the method further comprises:

receiving information related to the specific cloud service and sent by the cloud server, and displaying an application interface of the specific cloud service according to the information related to the specific cloud service.

7. The method according to claim 1, wherein an indicator is turned on to provide a prompt when the user's operation of triggering the key is received.

8. A thin client, configured to connect to a cloud server, wherein the thin client comprises: a key, a sending unit, and a message generating unit;
wherein the key is configured to receive a user's triggering operation, and the key is in a preset binding relationship with a specific cloud service of the cloud server; the message generating unit is configured to generate a triggering message according to an operation of triggering the key; and
wherein the sending unit is configured to send the triggering message to the cloud server, so that the cloud server invokes the specific cloud service according to the preset binding relationship.

9. The thin client according to claim 8, wherein:
the preset binding relationship is a binding relationship between identification information of the key and network address information of the thin client to which the key belongs, and the specific cloud service of the cloud server;
the triggering message comprises the identification information of the key and the network address information of the thin client to which the key belongs; and
the sending unit is configured to send the triggering message that comprises the identification information of the key and the network address information of the thin client to which the key belongs to the cloud server, so that the cloud server invokes the specific cloud service according to the preset binding relationship.

10. The thin client according to claim 8, wherein:
the preset binding relationship is a binding relationship between network address information of the thin client to which the key belongs and the specific cloud service of the cloud server;
the triggering message comprises the network address information of the thin client to which the key belongs; and
the sending unit is configured to send the triggering message that comprises the network address information of the thin client to which the key belongs to the cloud server, so that the cloud server invokes the specific cloud service according to the preset binding relationship.

11. The thin client according to claim 8, wherein:
the preset binding relationship is a binding relationship between identification information of the key and login account information of the user, and the specific cloud service of the cloud server;
the triggering message comprises the identification information of the key and login account information that is input when the user logs in to the thin client; and
the sending unit is configured to send the triggering message that comprises the identification information of the key and the login account information of the user to the cloud server, so that the cloud server invokes the specific cloud service according to the preset binding relationship.

12. The thin client according to claim 8, wherein:
the preset binding relationship is a binding relationship between login account information of the user and the specific cloud service of the cloud server;
the triggering message comprises login account information that is input when the user logs in to the thin client; and
the sending unit is configured to send the triggering message of the login account information of the user to the cloud server, so that the cloud server invokes the specific cloud service according to the preset binding relationship.

13. The thin client according to claim 8, wherein:
the thin client further comprises a displaying unit and a receiving unit;
the receiving unit is configured to, when the cloud server invokes the specific cloud service, receive information related to the specific cloud service and sent by the cloud server; and
the displaying unit is configured to, after the information related to the specific cloud service and sent by the cloud server is received, display an interface of the specific cloud service according to the information related to the specific cloud service.

14. The thin client according to claim 13, wherein the displaying unit comprises a touch display, an LCD display, or an LED display.

15. The thin client according to claim 8, wherein the thin client further comprises an indicator, and the indicator is configured to provide a prompt by being turned on when a user's operation of triggering the key is received.

16. A method for invoking a cloud service, the method comprising:
receiving a triggering message that is generated by a thin client according to triggering of a key, wherein the key is in a preset binding relationship with the specific cloud service; and
invoking a specific cloud service according to the triggering message and the preset binding relationship.

17. The method according to claim 16, wherein:
the triggering message comprises identification information identifying the key and network address information of a thin client to which the key belongs; and
receiving a triggering message that is generated by a thin client according to triggering of a key comprises: receiving the triggering message that comprises the identification information of the key and the network address information of the thin client to which the key belongs.

18. The method according to claim 16, wherein:
the triggering message comprises network address information of a thin client to which the key belongs; and
receiving a triggering message that is generated by a thin client according to triggering of a key comprises: receiving the triggering message that comprises the network address information of the thin client to which the key belongs.

19. The method according to claim 16, wherein:
the triggering message comprises identification information of the key and login account information that is input when a user logs in to the thin client; and
receiving a triggering message that is generated by a thin client according to triggering of a key comprises: receiving the triggering message that comprises the identification information of the key and the login account information that is input when the user logs in to the thin client.

20. The method according to claim 16, wherein:
the triggering message comprises login account information that is input when a user logs in to the thin client; and
receiving a triggering message that is generated by a thin client according to triggering of a key comprises: receiving the triggering message that comprises the login account information that is input when the user logs in to the thin client.

21. The method according to claim 16, wherein after invoking the specific cloud service according to the triggering message, the method further comprises sending information related to the specific cloud service, so that the thin client displays an interface of the specific cloud service according to the information related to the specific cloud service.

22. The method according to claim 16, wherein before receiving a triggering message that is generated by a thin client according to triggering of a key, the method further comprises:
   receiving a user-configured invoking relationship between the key and the specific cloud service, and generating a configuration file according to information of the invoking relationship between the key and the specific cloud service; and
   wherein invoking the specific cloud service according to the triggering message comprises: invoking the specific cloud service according to the triggering message and the configuration file.

23. A cloud server comprising:
   a receiving unit;
   a service invoking unit;
   wherein the receiving unit is configured to receive a triggering message that is generated by a thin client according to an operation of triggering a key, and the key is in a preset binding relationship with the specific cloud service; and
   wherein the service invoking unit is configured to obtain the preset binding relationship, and invoke a specific cloud service according to the triggering message and the preset binding relationship.

24. The cloud server according to claim 23, wherein:
   the triggering message comprises identification information identifying the key and network address information of a thin client to which the key belongs; and
   the service invoking unit is configured to receive the triggering message that comprises the identification information of the key and the network address information of the thin client to which the key belongs.

25. The cloud server according to claim 23, wherein:
   the triggering message comprises network address information of a thin client to which the key belongs; and
   the service invoking unit is configured to receive the triggering message that comprises the network address information of the thin client to which the key belongs.

26. The cloud server according to claim 23, wherein:
   the triggering message comprises identification information of the key and login account information that is input when a user logs in to the thin client; and
   the service invoking unit is configured to receive the triggering message that comprises the identification information of the key and the login account information that is input when the user logs in to the thin client.

27. The cloud server according to claim 23, wherein:
   the triggering message comprises login account information that is input when a user logs in to the thin client; and
   the service invoking unit is configured to receive the triggering message that comprises the login account information that is input when the user logs in to the thin client.

28. The cloud server according to claim 23, wherein the cloud server further comprises:
   a sending unit configured to, after the service invoking unit invokes the specific cloud service according to the triggering message, send information related to the specific cloud service, so that the thin client displays an interface of the specific cloud service according to the information related to the specific cloud service.

29. The cloud server according to claim 23, wherein:
   the receiving unit is further configured to receive a user-configured invoking relationship between the key and the specific cloud service;
   the cloud server further comprises a configuration file generating unit configured to generate a configuration file according to information of the invoking relationship between the key and the specific cloud service after the receiving unit receives the user-configured invoking relationship between the key and the specific cloud service; and
   the service invoking unit is configured to invoke the specific cloud service according to the triggering message and the configuration file that is generated by the configuration file generating unit.

30. The cloud server according to claim 23, wherein the cloud server further comprises:
   a cloud service processing unit configured to, when the service invoking unit invokes the specific cloud service according to the triggering message, execute the specific cloud service.

31. The cloud server according to claim 23, wherein:
   the cloud server further comprises a storage unit configured to store the preset binding relationship; and
   the service invoking unit is configured to obtain the preset binding relationship stored in the storage unit.

* * * * *